United States Patent [19]

Hay

[11] 3,968,980

[45] July 13, 1976

[54] OCCUPANT RESTRAINT SYSTEM

[75] Inventor: Charles N. Hay, Sandusky, Ohio

[73] Assignee: General Motors Corporation, Detroit, Mich.

[22] Filed: Feb. 12, 1973

[21] Appl. No.: 331,663

[52] U.S. Cl................................. 280/734; 222/5; 60/254; 280/737
[51] Int. Cl.² ....................................... B60R 21/10
[58] Field of Search ............... 280/150 AB; 138/43, 138/45, 46; 137/68; 60/254; 222/5

[56] References Cited
UNITED STATES PATENTS

| | | | |
|---|---|---|---|
| 2,612,747 | 10/1952 | Skinner............................. | 138/45 X |
| 2,754,910 | 7/1956 | Derrick et al..................... | 138/46 X |
| 3,073,112 | 1/1963 | Bleikamp........................... | 60/254 |
| 3,167,912 | 2/1965 | Ledwith............................. | 60/254 |
| 3,332,432 | 7/1967 | Marsh................................. | 137/68 |
| 3,643,971 | 2/1972 | Kushnick........................... | 280/150 AB |
| 3,663,036 | 5/1972 | Johnson............................. | 280/150 AB |
| 3,674,059 | 7/1972 | Stephenson ..................... | 280/150 AB |
| 3,713,667 | 1/1973 | Blanchard ....................... | 280/150 AB |
| 3,715,131 | 2/1973 | Hurley............................... | 280/150 AB |

Primary Examiner—Kenneth H. Betts
Attorney, Agent, or Firm—Herbert Furman

[57] ABSTRACT

A vehicle subject to high level and low level impact conditions includes an occupant restraint cushion which is inflated at a relatively high rate under high impact conditions and at a relatively low rate under low level impact conditions. The inflator for the cushion includes a pressure vessel containing pressurized stored gas and a combustion chamber containing a propellant. Under low level impact conditions, the propellant is ignited and the resultant gases flow through a fluted orifice into the pressure vessel and then flow with the stored gas to the cushion. The area of the orifice controls the flow rate of the resultant gases out of the combustion chamber to control the pressure within the chamber and the burn rate. Under high level impact conditions, a ball within the combustion chamber is explosively fired into the orifice to restrict the flow area of the orifice. This increases the pressure within the combustion chamber to increase the burn rate and the flow rate to the cushion.

4 Claims, 7 Drawing Figures

OCCUPANT RESTRAINT SYSTEM

This invention relates generally to occupant restraint systems and more particularly to a hybrid or augmented type inflator for an inflatable occupant restraint cushion.

Known inflators for occupant restraint cushions are generally of three types. One type is the so-called pure gas inflator wherein a pressure vessel contains stored pressurized gas. The pressure vessel is communicated with the cushion through various types of rupturable outlets or diaphragms. Another type is the gas generator wherein a propellant is ignited and the resultant gases flow through an outlet to the cushion. A third type is the so-called hybrid or augmented type. This type includes a pressure vessel containing stored pressurized gas. Also contained within the pressure vessel is a gas generator. When the generator is ignited, the resultant gas flows with the stored gas to the cushion through the pressure vessel outlet.

It is also known to inflate the cushion at a relatively low rate under low level impact conditions and at a relatively high rate under high level impact conditions. This can be accomplished in a pure gas type inflator by providing the pressure vessel with an outlet of variable flow area. In a gas generator type inflator, the burn rate of the propellant can be varied. In a hybrid type inflator, the gas generator may be operable independently of release of the stored gas or the burn rate of the propellant thereof may be varied. The inflator of this invention is of the hybrid type and provides for inflation of the cushion at either a low rate or a high rate in accordance with low level and high level impact conditions by controlling the burn rate of the propellant within the combustion chamber of the gas generator.

In the preferred embodiment of the invention, the burn rate of the propellant is controlled by controlling the pressure within the combustion chamber. When the propellant charge within the combustion chamber is ignited, the resultant gases must flow through an orifice of fluted shape before the gases can flow into the pressure vessel. The orifice area is set to provide a burn rate of the propellant which provides for inflation of the cushion by the resultant gases and the stored gas at the relatively low rate under low level impact conditions. Under high level impact conditions, a ball is explosively fired through the combustion chamber and into engagement with the ribs of the orifice flutes to thereby reduce the area of the orifice. This increases the pressure within the combustion chamber and in turn increases the burn rate. The resultant gases will then flow at a much higher rate through the reduced area orifice to the cushion with the stored gas to inflate the cushion at the high rate.

One feature of this invention is that the burn rate of a propellant within a combustion chamber is increased by firing a ballistic element through the combustion chamber and into engagement with an orifice to reduce the orifice area and increase the pressure within the combustion chamber. Another feature of this invention is that the orifice includes a central aperture opening to a plurality of flutes, and the ballistic element is a ball deformably engaging the ribs of the flutes to be retained within and close the central aperture and thereby restrict the flow of resultant gases only through the flutes. A further feature of this invention is that the combustion chamber is of annular elongated configuration, with the orifice being located adjacent one end thereof and the ball element being located adjacent the other end thereof coaxial with the orifice aperture and being explosively fired into the orifice aperture. Yet another feature of this invention is that the orifice may be either tapered or cylindrical. Yet a further feature of this invention is that the propellant is positioned between the ballistic element and the orifice and is electrically ignited by a squib adjacent a squib which explosively fires the ball into the orifice aperture.

These and other features of the invention will be readily apparent from the following specification and drawings wherein.

Figure 1:
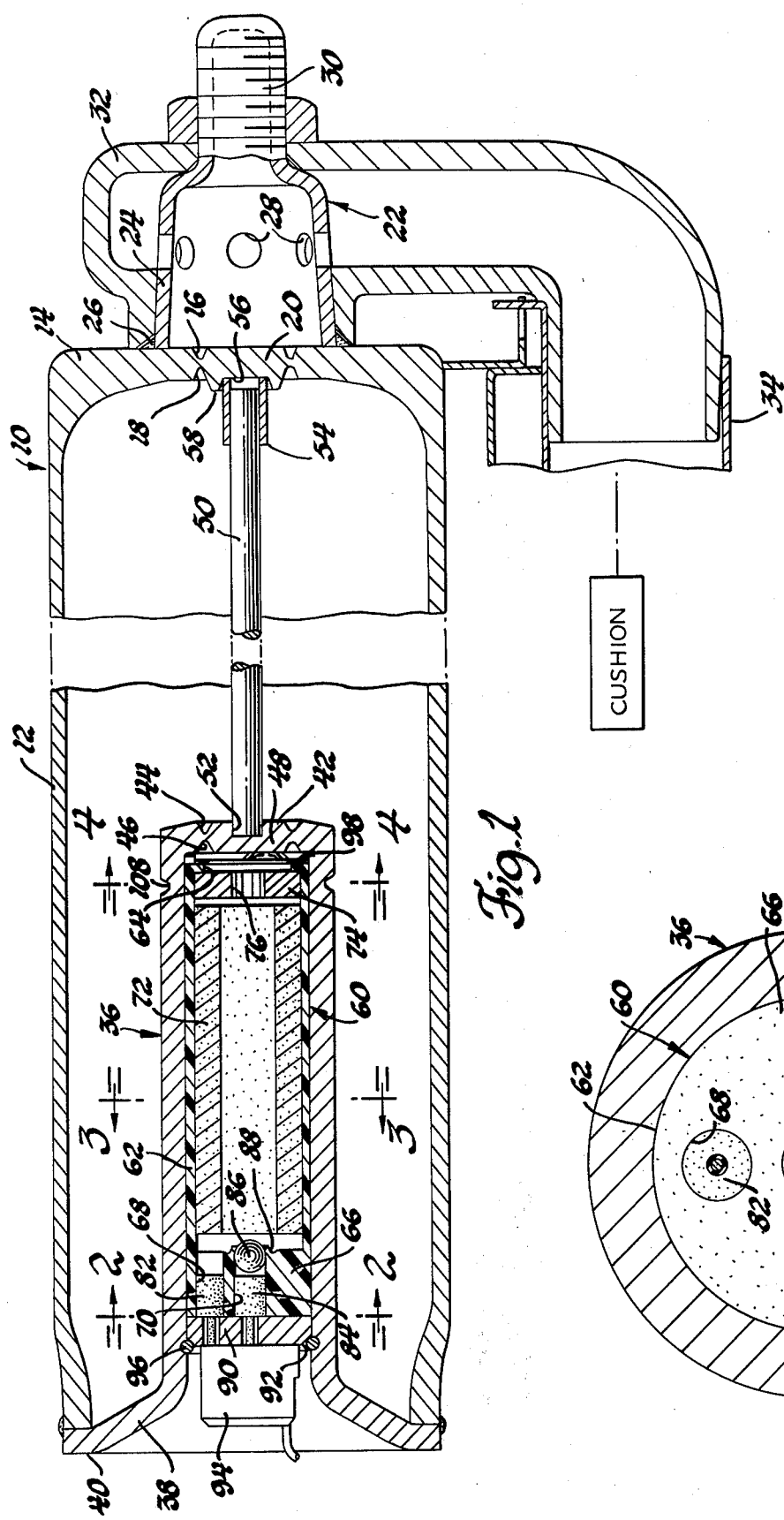
FIG. 1 is a longitudinal sectional view of an inflator according to this invention.
Figure 2:
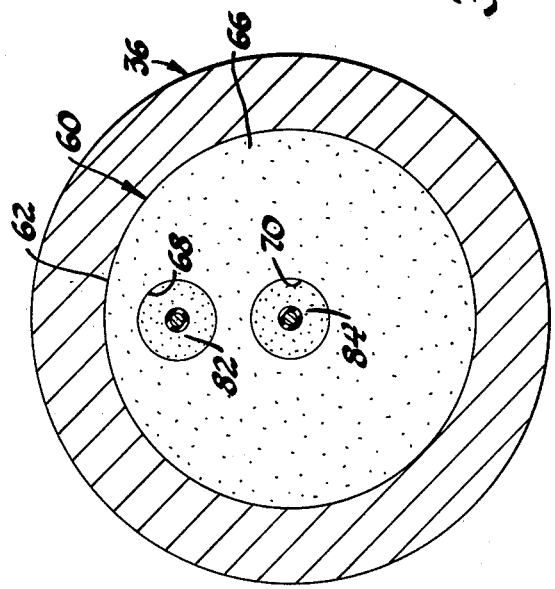
FIG. 2 is an enlarged sectional view taken generally along the plane indicated by line 2—2 of FIG. 1.
Figure 3:
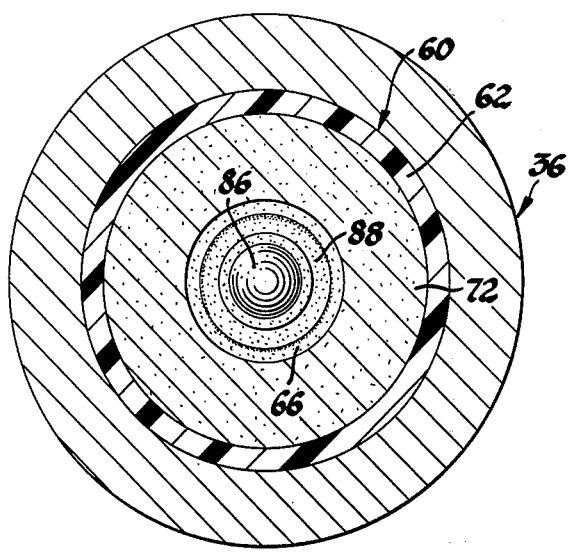
FIG. 3 is an enlarged sectional view taken generally along the plane indicated by line 3—3 of FIG. 1.

Referring now particularly to FIG. 1 of the drawings, an inflator designated generally 10 includes a cylindrical pressure vessel 12 of metal. An integral end wall 14 of the pressure vessel includes coaxial opposed generally V-shaped cross section grooves 16 and 18 which define an integral severable plug or diaphragm 20 of wall 14. An outlet member 22 of tapered configuration has the base wall 24 thereof welded at 26 to wall 14 around the diaphragm 20. The member 22 includes a plurality of spaced radial openings 28 and an integral externally threaded cylindrical lug 30. The member 22 is received within and bolted to a manifold 32 which in turn communicates with a diffuser 34 of a conventional occupant restraint cushion. Reference may be had to Ser. No. 255,027 Matthews, filed May 19, 1972 and assigned to the assignee of this invention for further details of the manifold and diffuser. When the diaphragm 20 is severed, the stored gas within the vessel 12 as well as the resultant gases from the gas generator, as will be described, flow into the outlet member 22 and thence to the cushion after passing through the openings 28, the manifold 32, and the diffuser 34.

A cylindrical combustion chamber 36 of metal includes an outwardly flaring skirt or end wall 38 which terminates in a peripheral flange 40. The flange 40 abuts against and is welded to the open end of the pressure vessel 12 to close the pressure vessel. The pressure vessel is filled with any suitable pressure fluid or gas. In the specific embodiment shown, the pressure vessel is filled with argon at 2400 psi.

An end wall 42 of the combustion chamber includes a pair of opposed V-shaped cross section grooves 44 and 46 which define a severable plug or diaphragm 48 which is coaxial with the diaphragm 20 of the pressure vessel. A rod 50 has one end thereof received within a bore 52 of the diaphragm 48 and has the other end thereof frictionally fitted within a sleeve 54. The sleeve 54 is received within a recess 56 integrally formed within the diaphragm 20 by providing a rib 58 on the inner surface thereof. The purpose of the rod will be hereinafter described, but it will be noted that the rod mechanically connects the diaphragms 48 and 20.

Received within the combustion chamber is a cartridge assembly 60 which includes a cylindrical member or housing 62 of plastic. One end of the housing includes a partial end flange which defines a cylindrical opening 64. The other end of the housing is closed by an integral end wall 66 of substantial thickness which is provided with a pair of cylindrical bores 68 and 70, the latter being coaxial with the housing.

Contained within the housing is a hollow cylindrical mass 72 of a suitable propellant which produces high temperature, high pressure gases when burned. Propellant such as this is well known and therefore it is not believed that any further details thereof are necessary to an understanding of this invention.

Figure 4:
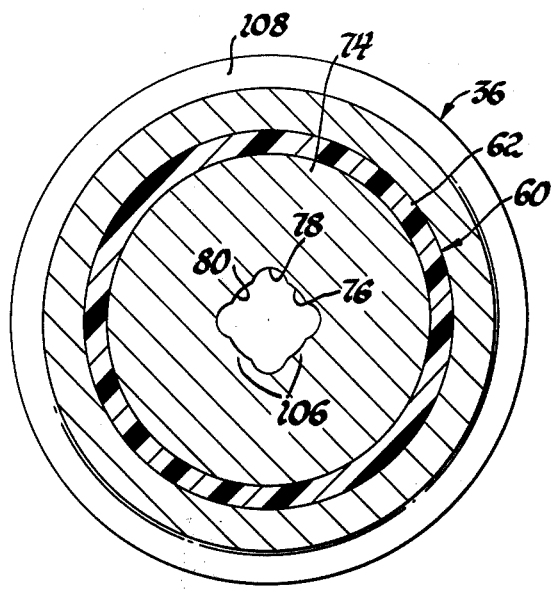
FIG. 4 is an enlarged sectional view taken generally along the plane indicated by line 4—4 of FIG. 1.

A metal orifice plate 74 seats against the end flange of housing 62. The orifice plate 74 includes a central outlet or orifice 76 which, as shown in FIG. 4, is defined by a plurality of flutes 78 which open to a central circular aperture 80. Although four flutes 78 are shown, other numbers of flutes can be used with equal success. The orifice 76 is of predetermined cross sectional area and is coaxial with the bore 70 and the diaphragm 48.

Contained within the bore 68 is a conventional electrically fired squib or igniter 82 and contained within the bore 70 is a conventional electrically fired squib 84. A ballistic element or ball 86 of metal is received within the bore 70 slightly ahead of the squib 84. The ball may be a conventional ball bearing and may either be frictionally fitted within the bore 70 or may be retained therein by a flange 88 heat deformed out of the material of wall 66 after the ball has been first inserted in the bore. The ball 86 is coaxial with the bore 70 and the orifice 76.

Figure 5:
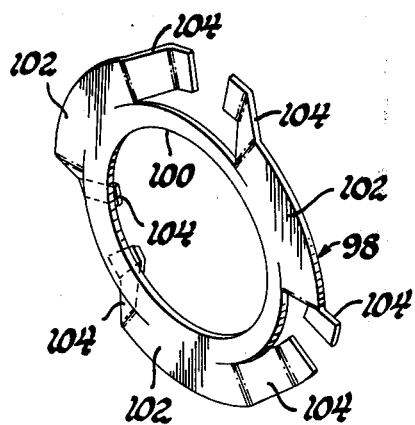
FIG. 5 is a perspective view of a spring element within the combustion chamber.

A seal plate 90 seats against the wall 66 within the combustion chamber and is provided with a beveled edge or wall 92. The seal plate may be integral with or separately formed and secured to an electrical plug 94. The leads from the plug are connected to the squibs 82 and 84. A split ring 96 of circular cross section is received within a similar cross section groove of the combustion chamber 36 and engages the wall 92 to retain the cartridge assembly 60 against movement outwardly of the combustion chamber. The cartridge assembly is seated against the split ring by a spring 98, shown in detail in FIG. 5. The spring 98 includes a circular body 100 having a plurality of integral peripheral flanges 102. The body and flanges seat against the partial end flange of the housing 62 which defines the opening 64. Each of the flanges 102 includes a pair of offset legs 104 which resiliently bear against wall 42 adjacent groove 46 to thereby resiliently bias the cartridge assembly 60 to the left or outwardly of the combustion chamber 36. This bias seats the beveled wall 92 of plate 90 against the split ring 96.

From the foregoing description, it can be seen that the cartridge assembly 60 can be completely assembled independently of the combustion chamber 36. The orifice plate 74, the mass 72 of propellant, the ball 86 and the squibs 82 and 84 can be assembled within the housing 62 as a module and this module can thereafter be mounted within the combustion chamber whenever desired.

Although not shown in the drawings, it will be understood that the electrical plug 94 is connected to a known sensing and actuating system. Such a system may, for example, include velocity responsive sensors mounted on the vehicle bumper and acceleration or inertia responsive sensors mounted on a part of the vehicle occupant compartment, such as the fire wall. These sensors are set so as to sense impact of the vehicle with an obstacle and to sense the level of impact conditions. The inflator 10 is shown in unactuated position and it will be understood that the inflatable occupant restraint cushion will be located in a folded position and mounted in a conventional manner within the occupant compartment, such as within the instrument panel. The recess 56 and the rib 58 cooperate with the sleeve 54 in always locating the rod 50 coaxial of diaphragms 20 and 48 despite possible vibrational movement of the rod during vehicle operation.

Assume now that the sensing and actuating system senses low level impact conditions due to impact of the vehicle with an obstacle. The squib 82 will be fired or ignited and ignite the mass 72 of propellant. As the propellant burns, it will produce high temperature, high pressure gas. The gas will flow through the orifice into the space between the plate 74 and wall 42. As the pressure within the combustion chamber 36 increases and reaches a predetermined level, the diaphragm 48 will be severed from the cumbustion chamber along the grooves 44 and 46 to provide a combustion chamber outlet. When the diaphragm 48 is severed, the rod 50 will be instantaneously shifted to the right within the sleeve 54 and in turn impact the diaphragm 20 to sever this diaphragm from the wall 14 and provide an inflator outlet. Thus both diaphragms 20 and 48 are severed to provide outlets from the combustion chamber to the pressure vessel and from the pressure vessel to the outlet member 22 and in turn to the occupant restraint cushion. The resultant gas from the combustion chamber will mix with the stored gas in the pressure vessel and then both will flow through the openings 28, the manifold 32, and the diffuser 34 to the cushion to inflate the cushion.

Assume now that the sensing and actuating system either initially senses high level impact conditions or senses such conditions subsequent to sensing low level impact conditions. When this occurs, the squib 84 will be ignited and will explosively fire the ball 86 out of the bore 70 and through the combustion chamber 36 into engagement with the aperture 80 of orifice plate 74. As shown in FIG. 4, the flutes 78 are separated from each other by arcuate ribs 106 which define aperture 80 and lie in a cylinder generated about the axis of the orifice 76. When the ball 86 is fired into the aperture 80, the ball deforms as it engages the ribs 106 so as to be tightly wedged against these ribs. The OD of the ball is larger than the diameter of the aperture. The ball thus reduces the area of the orifice 76 so that the resultant gas now can only flow through the flutes 78. When the orifice area is reduced, the pressure within the combustion chamber 36 will increase. This in turn increases the rate of burn of the mass 72 of propellant so that the resultant gas is now at a much higher pressure and will flow at a much higher rate through the flutes into the pressure vessel 12 and thence to the cushion. The cushion will thus be inflated at a relatively high rate compared to the relatively low rate which occurs when the orifice area is not reduced.

Thus the inflator of this invention utilizes a single charge or mass of propellant and provides for inflation of the occupant restraint cushion at a relatively low rate under low level impact conditions and at a relatively high rate uner high level impact conditions by controlling the rate of burn of the propellant material.

This is accomplished by controlling the pressure within the combustion chamber through the orifice area of the combustion chamber outlet.

It will be noted with reference to FIGS. 1 and 4 that the combustion chamber 36 includes a continuous peripheral groove 108 generally radially opposite the orifice plate 74. This groove weakens the side wall of the combustion chamber so that if the pressure within the combustion chamber 36 rises above a predetermined level upon reduction of the area of the orifice 76, the righthand end portion of the combustion chamber will be severed at the groove 108 to immediately reduce the pressure below such level.

Figure 6:
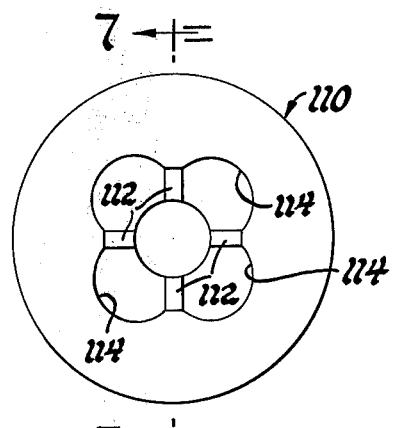
FIG. 6 is a view of an alternate orifice.
Figure 7:
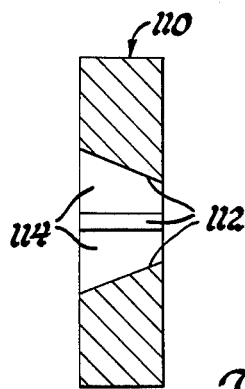
FIG. 7 is a sectional view taken generally along the plane indicated by line 7—7 of FIG. 6.

FIGS. 6 and 7 show an alternate orifice plate 110. Plate 110 differs from plate 74 in that the ribs 112 between the flutes 114 lie on a cone rather than on a cylinder. The central aperture defined by the ribs is likewise concical and the flutes 114 are tapered. The largest OD of the cone can be either equal to or larger than the OD of the ball 86 as desired. The orifice plate 110 will function in the same manner as the plate 74 when it receives the ball 86 to reduce the orifice area of the plate.

Thus, this invention provides an improved inflator.

I claim:

1. In combination with a vehicle subject to low level impact conditions and high level impact conditions and including an inflatable occupant restraint cushion, inflating means for inflating the cushion at a relatively high rate under high level impact conditions and at a relatively low rate under low level impact conditions comprising, a combustion chamber containing a mass of propellant having an opening therethrough and capable of producing pressure fluid by burning and having a burn rate responsive to the pressure within the chamber, outlet means of predetermined orifice area controlling the rate of flow of the pressure fluid from the chamber to control the pressure within the chamber and the rate of burning, means communicating the outlet means with the cushion, the outlet means normally setting a rate of flow of pressure fluid to the cushion to inflate the cushion at the relatively low rate, a ball, means mounting the ball within the combustion chamber to one side of the mass of propellant and in general spaced alignment with the opening therethrough and the outlet means, and means responsive to the occurrence of high level impact conditions for firing the ball through the opening in the mass of propellant and into the outlet means to reduce the orifice area thereof and thereby increase the pressure within the combustion chamber to increase the rate of burn and provide inflation of the cushion at the relatively high rate.

2. In combination with a vehicle subject to low level impact conditions and high level impact conditions and including an inflatable occupant restraint cushion, inflating means for inflating the cushion at a relatively high rate under high level impact conditions and at a relatively low rate under low level impact conditions comprising, a combustion chamber containing a mass of propellant having an opening therethrough and capable of producing pressure fluid by burning and having a burn rate responsive to the pressure within the chamber, outlet means including an aperture and a plurality of flutes within the aperture providing an orifice of predetermined area normally setting a rate of flow of pressure fluid to the cushion to inflate the cushion at the relatively low rate, means communicating the outlet means with the cushion, a ball, means mounting the ball within the combustion chamber to one side of the mass of propellant and in general spaced alignment with the opening therethrough and the orifice of the outlet means, and means responsive to the occurrence of high level impact conditions for firing the ball through the opening in the mass of propellant and into deformable engagement with the flutes to reduce the area of the orifice and thereby increase the pressure within the combustion chamber to increase the rate of burn and provide inflation of the cushion at the relatively high rate.

3. In combination with a vehicle subject to low level impact conditions and high level impact conditions and including an inflatable occupant restraint cushion, inflating means for inflating the cushion at a relatively high rate under high level impact conditions and at a relatively low rate under low level impact conditions comprising, a combustion chamber containing a mass of propellant having an opening therethrough and capable of producing pressure fluid by burning and having a burn rate responsive to the pressure within the chamber, outlet means including a frustro-conical aperture increasing in area toward the mass of propellant, and a plurality of flutes within the aperture and cooperatively providing therewith an orifice of predetermined area normally setting a rate of flow of pressure fluid to the cushion to inflate the cushion at the relatively low rate, means communicating the outlet means with the cushion, a ball, means mounting the ball within the combustion chamber to one side of the mass of propellant and in general alignment with the opening therethrough and the orifice of the outlet means, and means responsive to the occurrence of high level impact conditions for firing the ball through the opening in the mass of propellant and into deformable engagement with the flutes to reduce the area of the orifice and thereby increase the pressure within the combustion chamber to increase the rate of burn and provide inflation of the cushion at the relatively high rate.

4. In combination with a vehicle subject to low level impact conditions and high level impact conditions and including an inflatable occupant restraint cushion, inflating means for inflating the cushion at a relatively high rate under high level impact conditions and at a relatively low rate under low level impact conditions comprising, a combustion chamber containing a mass of propellant having an opening therethrough and capable of producing pressure fluid by burning and having a burn rate responsive to the pressure within the chamber, outlet means including an orifice of predetermined area normally setting a rate of flow of pressure fluid to the cushion to inflate the cushion at the relatively low rate, means communicating the outlet means with the cushion, means within the chamber defining a bore axially aligned with the opening of the mass of propellant and the orifice, a ball mounted within the bore, and explosive means responsive to the occurrence of high level impact conditions for firing the ball out of the bore and through the opening in the mass of propellant into the orifice to reduce the area thereof and thereby increase the pressure within the combustion chamber to increase the rate of burn and provide inflation of the cushion at the relatively high rate.

* * * * *